Figure 1A:
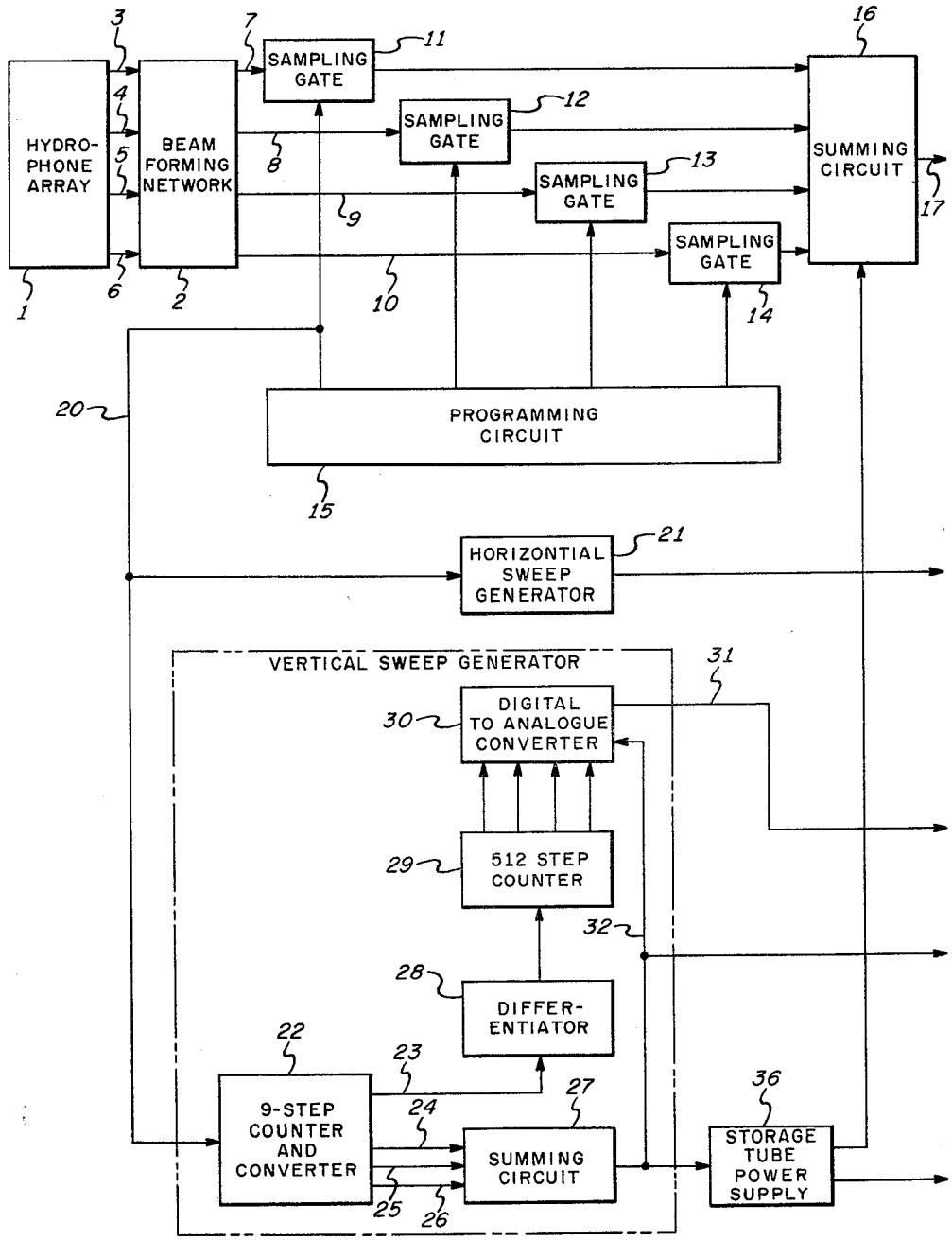

April 13, 1965     D. E. JACKSON ETAL     3,178,680

ELECTRONIC SIGNAL STORAGE AND DISPLAY SYSTEM

Filed Dec. 6, 1960     3 Sheets-Sheet 3

INVENTORS
DONALD E. JACKSON
GEORGE RAND
BY
ATTORNEY

United States Patent Office 3,178,680
Patented Apr. 13, 1965

3,178,680
ELECTRONIC SIGNAL STORAGE AND DISPLAY SYSTEM
Donald E. Jackson, Glen Cove, and George Rand, Franklin Square, N.Y., assignors to Sperry Rand Corporation, Great Neck, N.Y., a corporation of Delaware
Filed Dec. 6, 1960, Ser. No. 75,067
3 Claims. (Cl. 340—6)

The present invention invention relates to signal storage and display systems and, more particularly, to a system of such type which is specially suited for the processing of incoming signals over extended periods of time.

In certain applications such as, for example, in the passive detection of signals received from underwater sound sources, provision must be made for discerning maximum information from signals emanating from unknown sources at unknown range. Present bearing information, of course, may be simply and readily derived through the use of a directional receiver. The problem remains, however, as to how the latent information (other than present bearing data) contained within the received signals may be best extracted and presented for evaluation.

The fact that the incoming signals may vary relatively slowly over extended periods of time suggests that it may be useful to sample and store said signals over long intervals. It is desirable that the signals be stored in such a way that they are immediately available for substantially instantaneous read out and correlation. In this manner, the recorded history of the incoming signals may be presented in its entirety at the same time so that relatively subtle and perhaps significant variations in the incoming signals may be more readily recognized and interpreted.

The manner in which the data being read out is actually displayed is also important. In accordance with the present invention, an electronic data presentation unit is provided whereby the most recently received (and hence most immediately significant) data is displayed at predetermined locations at which the greatest presentation accuracy and greatest visual impact is produced. In a preferred embodiment, the data presentation unit is a cathode ray tube similar to the familiar plan position indicator. The presentation differs from that produced on a PPI in that the received signals are displayed in terms of time and azimuth coordinates rather than in terms of range and azimuth coordinates. The most recently received signals are always displayed about the circumference of the cathode ray tube, i.e., at maximum radial positions from the origin of the display.

The principal object of the present invention is to provide all electronic means for storing signals received over extended time intervals and for displaying the stored signals substantially instantaneously in accordance with their order of occurrence relative to the most recently received signals.

Another object is to provide means for passively detecting and displaying signals emanating from underwater sound sources.

A further object is to provide means for storing signals received from underwater sound sources and for displaying the stored signals in terms of bearing and time coordinates, the latter being referenced relative to the time of occurrence of the most recently received signals.

An additional object is to provide means including a cathode ray tube for the display in polar coordinates of stored signals which are received over extended time intervals, the most recently received signals being displayed at maximum radial locations.

Figure 1B:
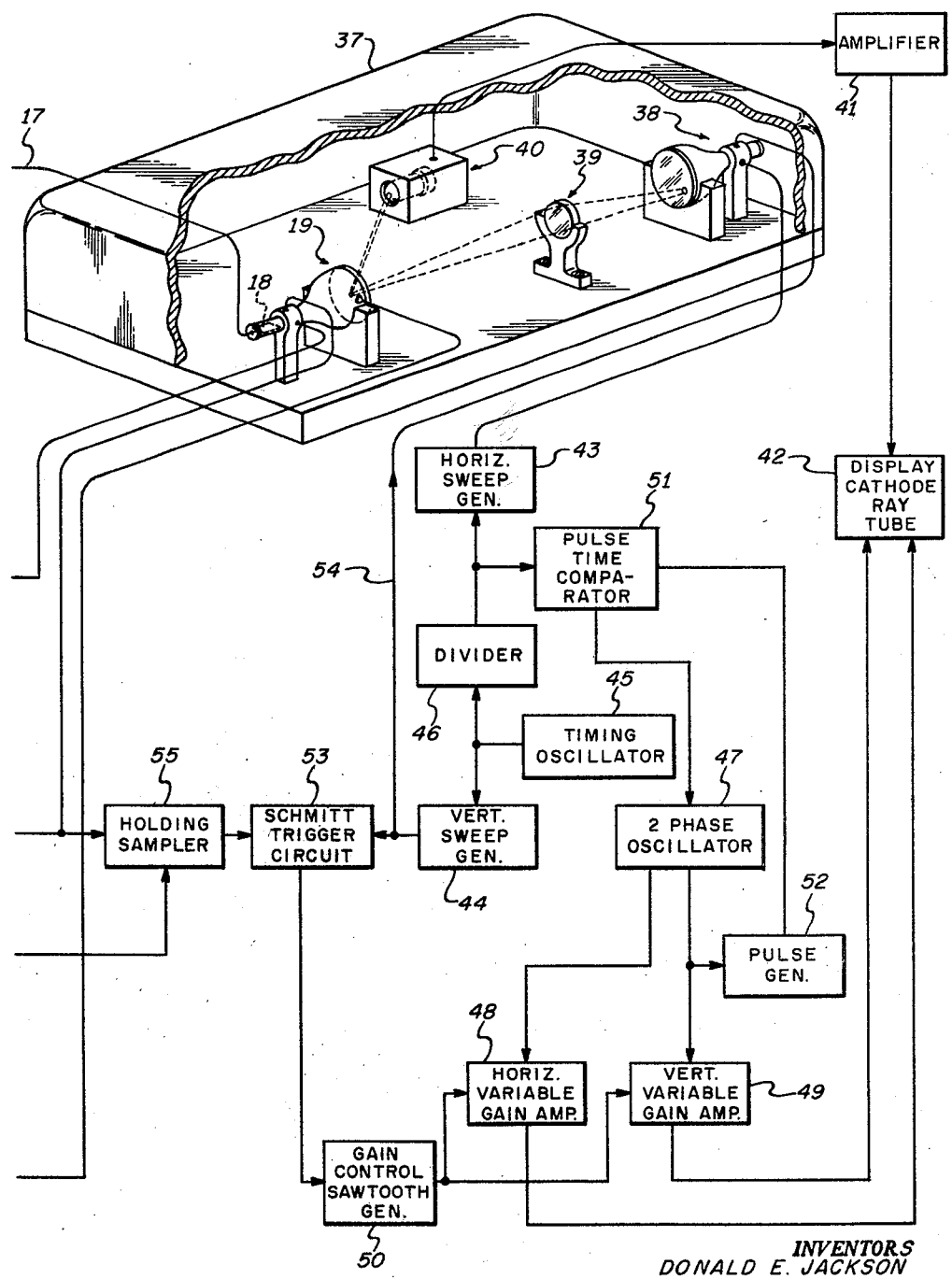
Figure 2:
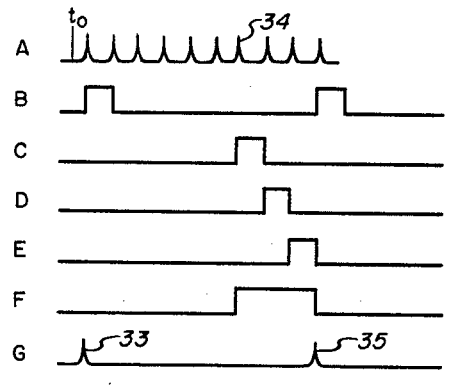
Figure 2:
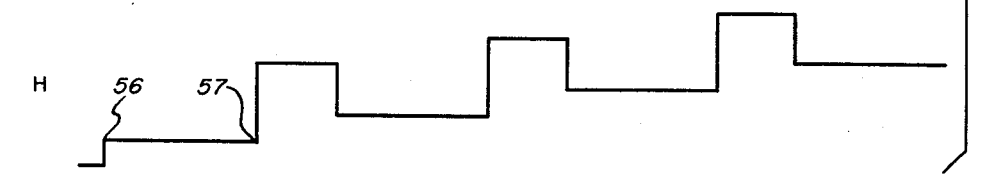
Figure 3:
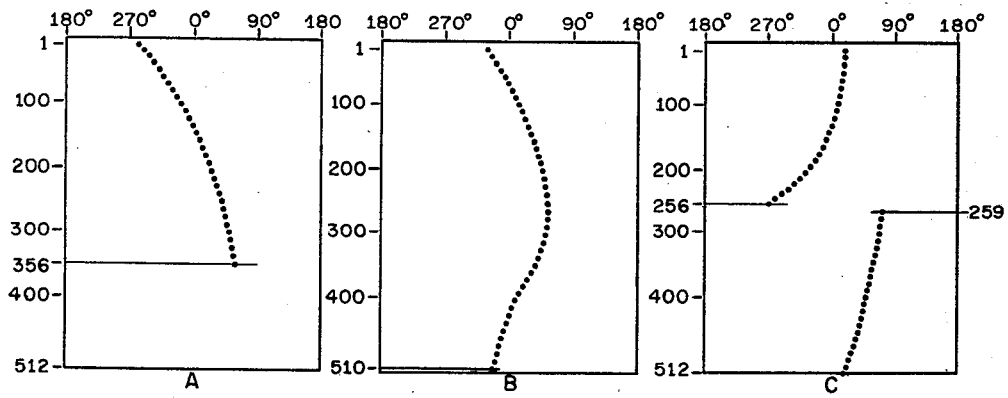
Figure 3:
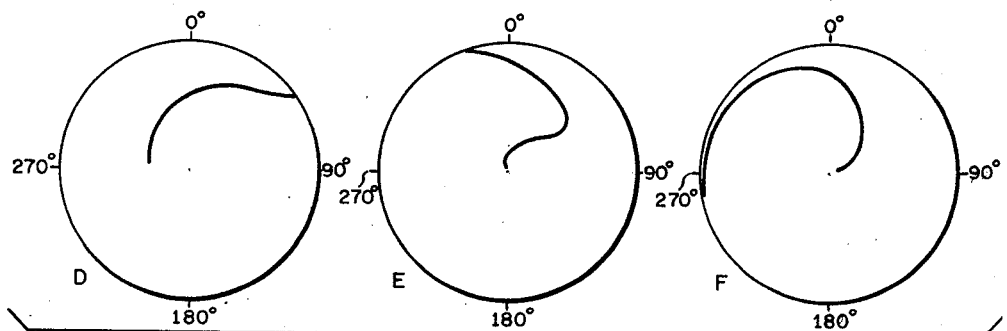

The fulfillment of these and other objects of the invention is accomplished in accordance with the following description of the typical embodiment represented in the drawings of which:

FIGS. 1a and 1b together comprise a simplified schematic diagram of a sonar embodiment of the present invention;

FIG. 2 is a series of idealized waveforms useful in explaining the operation of the apparatus of FIG. 1; and FIG. 3 is a series of stored data patterns together with the corresponding data displays generated by the apparatus of FIG. 1.

Referring to FIG. 1, hydrophone array 1 and beam forming network 2 coact to produce an inertialess steerable directional receiving characteristic for passively detecting signals received from underwater sound sources. The array is comprised of a plurality of individual sound transducers each producing a respective output on one of the representative plurality of signal lines 3, 4, 5 and 6. Network 2 processes the individual signals appearing on lines 3-6 by combining them in predetermined relationships in a well known manner such as set forth in Anderson, "Digital Array Phasing," Journal of the Acoustical Society of America, July 1960, page 867. The effect is to simulate a plurality of individual directive receivers each pointed in a predetermined different direction or bearing, $\theta_1$, $\theta_2$ . . . $\theta_n$.

The signals which are received from the varying directions $\theta_1$, $\theta_2$ . . . $\theta_n$ appear on respective ones of the four illustrative output lines 7, 8, 9, 10. An equal plurality of sampling gates 11, 12, 13 and 14 are coupled to respective ones of lines 7, 8, 9 and 10. The sampling gates, in turn, are actuated in time succession by trigger pulses produced in programming circuit 15. Circuit 15 in essence is an electronic commutator, whose design will be readily apparent to those skilled in the art, which produces a repetitive sequence of output pulses, each successive pulse appearing on a successive output line. Thus, the sampling gates will be opened, i.e., rendered conductive, in the order of their numerical designations over and over again.

As each sampling gate is opened, the sonar information in its corresponding bearing direction is sampled and coupled to summing circuit 16. Circuit 16, which may comprise a conventional analogue resistive summation network, multiplexes the signals passed by the successively actuated sampling gates on a single output line 17 for application to the control grid 18 of dark trace storage tube 19.

A single horizontal sweep is generated for storage tube 19 for each cycle of actuation of the sampling gates 11-14. Each horizontal sweep is initiated by the same pulse appearing on line 20 which triggers sampling gate 11 associated with the reference bearing direction $\theta_1$. The pulse triggers horizontal sweep generator 21 to produce a conventional sawtooth voltage wavefrom for application to the horizontal deflecting element of storage tube 19. In a typical case, a relatively low repetition rate of three cycles per second may be employed.

The triggering pulses of line 20 are also applied to pulse counter and converter 22. Device 22 may comprise a cascaded chain of conventional binary elements such as multivibrators. In the illustrative embodiment of FIG. 1, the counter has a maximum numerical capacity of nine. That is, one output pulse is produced for every nine input pulses applied via line 20. A conventional binary to analogue converter is associated with device 22 for producing an output signal on one of the plurality of output lines 23, 24, 25 and 26 in accordance with the numerical value of the count then obtaining in the counter portion. That is, line 23 is energized when the stored count is 1, line 24 is energized when the stored count is 7, line 25 is energized when the stored count is 8 and line 26 is energized when said count is 9. No other outputs are required. A suitable converter is shown in FIGS. 4–22 of Susskind, Notes on Analog-Digital Conversion Techniques, Technology Press (MIT) 1957.

A typical repetitive train of pulses as may be produced on line 20 is shown in waveform A of FIG. 2. The positive pedestals of waveform B are produced during the times that the value of the count stored in the counter of device 22 is 1. Similarly, the positive pedestals of waveform C, D and E are produced during the times that the values of the counts respectively are 7, 8 and 9. Waveforms B, C, D and E respectively appear on lines 23, 24, 25 and 26. Lines 24, 25 and 26 are coupled to the input of summing circuit 27. Circuit 27 produces the signal of waveform F of FIG. 2 having a positive pedestal of a duration equal to the time that the value of the count remains between 7 and 9.

Waveform B of FIG. 2 is applied via line 23 to the input of differentiator 28 to produce the positive-going trigger pulses of waveform G coincident with the leading edges of the positive pedestals of waveform B. Each trigger pulse of waveform G is applied to counter 29 and advances the count stored therein by an increment of unity. In the illustrative embodiment, the numerical capacity of counter 29 is 512. Digital to analogue converter 30 is coupled to the output of counter 29 to produce on line 31 a voltage having an amplitude representing the value of the count stored in counter 29. Converter 30 may comprise a conventional decoder circuit such as shown in FIGS. 5–18 of the aforementioned book.

The voltage represented by waveform F of FIG. 2 is also applied to converter 30 via line 32. The voltage pulse of line 32, when present, causes the introduction of an additional current in converter 30 equal to an incremental increase of three in the value of the count stored in counter 29. The resulting three step incremental increase in the voltage of line 31 persists for the duration of the positive pedestal of waveform F of FIG. 2. The resultant voltage of line 31 is represented by waveform H of FIG. 2.

Referring to waveform H, it will be seen that the represented value of the count stored in counter 29 increases to 1 in response to the first output pulse 33 of differentiator 28. The amplitude of the voltage of line 31 remains at the same level while the value of the count stored in counter 22 increases from 1 to 6. Upon the occurrence of the seventh pulse 34 of waveform A at the input to the counter of device 22, the positive pedestal of waveform F is produced which increases the amplitude of the voltage of line 31 by three units as previously described. The voltage of line 31 remains at the new higher value until the occurrence of pulse 35 of waveform G whereupon the value of the count stored in said counter resets from 9 to 1 and the value of the count in counter 29 increases by unity. The net effect is a reduction in the amplitude of the voltage of line 31 by a decrement of 2. The voltage waveform H of FIG. 2 is applied to the vertical deflecting element of dark trace tube 19.

In operation, the electron beam of storage tube 19 is swept horizontally six successive times at the same vertical displacement. Then, the beam is abruptly displaced upward by three vertical increments. Three successive horizontal sweeps are traced at the new vertical displacement. Signal integration is achieved during the first six horizontal sweeps. During the time of the next following three horizontal sweeps, the positive pedestal of waveform F is applied to storage tube power supply 36 which applies proper potentials to both the control grid and accelerator of tube 19 to effect the "erasure" of the stored signals in a well known manner. When said erasure has been accomplished, the electron beam within tube 19 is abruptly displaced back by two vertical increments to a position which is one increment displaced from its original vertical position. The sequence of horizontal and vertical scanning then repeats. Thus, new data is written in and integrated line by line on the storage element of tube 19 with the oldest stored information, if any, being erased line by line just prior to the writing in of new information.

Storage tube 19 is enclosed within a light-tight box 37. The data stored on the face of tube 19 is read out in a conventional manner by flying spot scanner 38. The light from the scanning luminous spot is directed by lens 39 to the face of tube 19. Photo-cell 40 detects changes in the light reflected from the face of the tube 19 and produces a current pulse as the scanning spot passes over sensitized areas representing stored data. As is well known, said sensitized areas absorb rather than reflect incident light. The current pulse representing detected stored data is applied by amplifier 41 to the control grid of display cathode ray tube 42.

The luminous spot generated by scanner 38 scans the entire surface area of storage tube 19 at a high rate. The spot is scanned in raster fashion by signals produced by horizontal and vertical sweep generators 43 and 44, respectively. In a typical case, the horizontal and vertical scanning frequencies may be of the order of 30 cycles per second and 21,600 cycles per second, respectively. The two sweep generators are triggered by output pulses produced by timing oscillator 45 which are directly applied to vertical sweep generator 44 and, via pulse divider 46, to horizontal sweep generator 43.

It is necessary, of course, to synchronize the deflection circuits of cathode ray tube 42 with the operation of the raster scanning circuits for scanner 38. Such synchronization is accomplished by providing two phase oscillator 47 which has a repetition interval substantially the same as the repetition interval of the horizontal sweep generator 43. Oscillator 47 produces in a known manner two output sinusoidal voltages in phase quadrature with respect to each other. The quadrature voltages are applied to the respective deflection elements of cathode ray tube 42 by horizontal and vertical amplifiers 48 and 49. Each of amplifiers 48 and 49 is of a variable gain type, and is controlled by a sawtooth signal generated within gain control sawtooth generator 50 in a manner to be described.

Proper phasing between the deflection signals of cathode ray tube 42 and scanner 38 is accomplished with the aid of pulse time comparator 51. One of the two sinusoidal signals produced by oscillator 47 is applied to pulse generator 52 which produces a pulse at a predetermined point, for example, at each zero crossover point, of the sinusoidal voltage. The pulse so produced is applied to comparator 51 wherein its occurrence is compared with the occurrence of the pulses produced at the output of divider 46. Any time displacement between the pulses applied to comparator 51 produces an error signal of proper amplitude and polarity to control the phase of oscillator 47 in corresponding magnitude and sense to bring the corresponding pulses in time coincidence at the respective inputs to comparator 51.

It will be noted that the vertical deflection frequency of scanner 38 is very much greater than the vertical deflection frequency of storage tube 19. Accordingly, one may consider that the luminous spot which scans the face of tube 19 crosses the sensitized horizontal lines on the face of tube 19 substantially at right angles. More particularly, if the successive vertically displaced horizontal sweeps of tube 19 move downwardly relative to box 37 at a slow rate, then the luminous spot is scanned upwardly across said sweeps at a very much higher rate.

It is desirable to produce a control pulse at the instant that the upwardly moving luminous spot crosses the horizontal line along which the most recent data is being presently stored in tube 19. This is achieved through the use of the Schmitt trigger circuit 53 to which are applied the vertical sweep voltages of tube 19 and scanner 38. The former sweep voltage is applied to circuit 53 via holding sampler 55. The purpose of sampler 55 is to apply only those portions of the sweep waveform of FIG. 2H which occur between points corresponding to points 56 and 57. Those portions are blocked which occur simultaneously with each successive erase pedestal of waveform 2F. This is accomplished by applying said pedestal via line 32 to sampler 55 to render it nonconductive. During the time when sampler 55 is nonconductive, it continues to apply to circuit 53 a voltage equal to that last obtaining on line 31 prior to the occurrence of the pedestal of waveform 2F. A suitable sampler is shown in FIG. 5–40 of the aforementioned Technology Press book.

As is well understood, circuit 53 produces an output pulse at the instant that the amplitude of one of the input signals traverses the amplitude of the other of the input signals, e.g., when the amplitude of the vertical sweep voltage on line 54 traverses the amplitude of the vertical sweep voltage on line 31. The pulse produced by circuit 53 is applied to and triggers gain control sawtooth generator 50. The output sawtooth signal, when applied to amplifiers 48 and 49, varies the gains thereof inversely as the amplitude of the sawtooth. Thus amplifiers 48 and 49 have maximum gain at the time of occurrence of the output pulse produced by circuit 53 which is the time when the luminous spot traverses the horizontal line along which the most recent data is presently being stored in tube 19. The result is that the resulting radial trace produced in cathode ray tube 42 is of maximum radial dimension at the time just considered. The radius decreases in proportion to the changing amplitude of the sawtooth produced by generator 50. The repetition rate of the sawtooth is substantially 21,600 cycles per second which is the rate at which the luminous spot recrosses the line of most recent data stored in tube 19.

It should be observed that the total data stored in tube 19 is read out at a very high rate and presented on the face of display cathode ray tube 42 in such a manner that the most recently received and stored data is displayed at maximum radius with the older data being displayed radially inwardly toward the center of tube 42. A typical display which may be generated on the face of tube 42 is shown in FIG. 3 together with the corresponding sensitized patterns of storage tube 19. The patterns of FIGS. 3A, B and C represent the locations of the sensitized spots on the face of tube 19 as they may appear at three successively later times as received sonar pulses are being stored. In all three, the vertical coordinate represents time whereas the horizontal coordinate represents bearing angle. A succession of sensitized spots is shown in FIG. 3A as they might be produced in response to signals received from an underwater sound source whose bearing angle is changing relative to hydrophone array 1. The oldest recorded data is shown at the top. The most recently received and stored data is represented by the bottommost spot at horizontal scanning line number 356. It will be recalled that there are a representative total of 512 vertically displaced horizontal lines along which received data may be stored in tube 19.

At a somewhat later time, additional sensitized spots will occur in the pattern of tube 19 such as shown in FIG. 3B. In the case of FIG. 3B, the entire storage capability of tube 19 has been fully utilized, i.e., 510 successive lines have been recorded with the remaining two lines having been erased. FIG. 3C shows the pattern as it might appear at an even later time following the successive erasures and recording of new data on uppermost lines 1–256. The most recent data is on line 256. The oldest data is on line 259. It should be noted that lines 257 and 258 are blank due to previous erasure. The data on line 1 immediately follows in time the data on line 512. In the next successive storage operation (not depicted), the sensitized spot on line 259 would be erased and previously erased line 257 would receive new data.

FIG. 3D shows the display of tube 42 as it would appear at the same time that the storage pattern of FIG. 3A occurs. FIGS. 3E and 3F similarly correspond to the storage patterns of FIGS. 3B and 3C. In each of FIGS. 3D, 3E and 3F the most recently stored data is shown at a position of maximum radial deflection. Thus, the outermost radial position of the trace of FIG. 3D is shown at the same bearing angle as the spot of line 356 of 3A. Similarly, the outermost radial position of the trace of FIG. 3E is shown at the same bearing as the spot of line 510 of FIG. 3B and the outermost radial position of the trace of FIG. 3F is at the same bearing angle as the spot of line 256 of FIG. 3C.

It can be seen that there is produced on the display of tube 42 a bearing versus time plot in polar coordinates of the data stored in tube 19. The most recently received data is always displayed at a reference position (outermost radial position) where it has both the greatest presentation accuracy (bearing data accuracy) and the greatest visual impact. Inasmuch as each horizontal storage line of tube 19 is retraced six times over, a measure of signal integration is received which tends to improve the signal to noise ratio of the received sonar signals. Although a relatively long period of time is required to fully fill the storage capacity of tube 19, all of the stored data which is present at any given time is displayed in its entirety substantially instantaneously on tube 42 with the most recently received data being readily distinguishable by its outermost radial position on the display of tube 42.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A system for processing signals received from underwater sound sources whose bearing direction is subject to change, said system comprising a scannable hydrophone array for receiving said signals, first means for scanning said array, means coupled to said array for storing the received signals in the order of their times of occurrence, second means for scanning the stored signals in the reverse order of said times of occurrence, said second means for scanning producing display signals representing the scanned stored signals, control means coupled to both said means for scanning, said control means producing a control pulse at the instant when the most recently stored signals are being scanned, a cathode ray tube having beam intensity modulating means, said display signals being applied to said beam intensity modulating means, triggerable means for radially sweeping the electron beam of said cathode ray tube from a point of maximum radial deflection to a point of minimum radial deflection, said control pulse being applied to said triggerable means, means for angularly deflecting said beam, and means coupled to said second means for synchronizing the operation of said means for angularly deflecting therewith.

2. A system for processing and displaying signals received from a signal source whose position is subject to change, said system comprising means for receiving said signals, means coupled to said means for receiving for storing the received signals in the order of their times of occurrence, means for scanning the stored signals in the reverse order of said times of occurrence, said means for scanning producing signals representing the scanned stored signals, means coupled to said means for storing and to said means for scanning to produce a control pulse at the instant when the most recently stored signals are being scanned, a cathode ray tube having beam intensity modulating means, said display signals being applied to said beam intensity modulating means, triggerable means for radially sweeping the electron beam of said cathode ray tube from a point of maximum radial deflection to a point of minimum radial deflection, said control pulse being applied to said triggerable means, means for angularly deflecting said beam, and means coupled to said scanning means for synchronizing the operation of said means for angularly deflecting therewith.

3. A system for processing and displaying signals received from a signal source whose direction is subject to change, said system comprising scannable directional means for receiving said signals, first means for scanning said directional means, means coupled to said means for receiving for storing the received signals in the order of their times of occurrence, second means for scanning the stored signals in the reverse order of said times of occurrence, said second means for scanning producing display signals representing the scanned stored signals, control means coupled to both said means for scanning, said control means producing a control pulse at the instant when the most recently stored signals are being scanned, a cathode ray tube having beam intensity modulating means, said display signals being applied to said beam intensity modulating means, triggerable means for radially sweeping the electron beam of said cathode ray tube from a point of maximum radial deflection to a point of minimum radial deflection, said control pulse being applied to said triggerable means, means for angularly deflecting said beam, and means coupled to said second means for synchronizing the operation of said means for angularly deflecting therewith.

References Cited by the Examiner

UNITED STATES PATENTS 2,911,876    11/59    Willey _____ 343—5 XR
3,039,079    6/62     Walters et al. _____ 343—6

OTHER REFERENCES

Harrington et al.: "Signal-to-Noise Improvement Through Integration in a Storage Tube," Proceedings of the IRE, vol. 38, No. 10, October 1950, pp. 1197–1203.

CHESTER L. JUSTUS, *Primary Examiner.*